(12) United States Patent
Sama et al.

(10) Patent No.: US 9,708,195 B2
(45) Date of Patent: Jul. 18, 2017

(54) TIO₂ BASED SCRUBBING GRANULES, AND METHODS OF MAKING AND USING SUCH TIO₂ BASED SCRUBBING GRANULES

(71) Applicant: CRISTAL USA, INC., Hunt Valley, MD (US)

(72) Inventors: Venkata Ramana Reddy Sama, Parkville, MD (US); Kit Stacey Eremchuk, Catonsville, MD (US); Mark D. Pomponi, Elliott City, MD (US); Gabor Feher, Glen Burnie, MD (US); Alexandre Jean Fines, Ellicott City, MD (US)

(73) Assignee: Cristal USA, Inc., Glen Burnie, MD (US)

( * ) Notice: Subject to any disclaimer, the term of this patent is extended or adjusted under 35 U.S.C. 154(b) by 0 days.

(21) Appl. No.: 14/395,560

(22) PCT Filed: Apr. 26, 2013

(86) PCT No.: PCT/US2013/038386
§ 371 (c)(1),
(2) Date: Oct. 20, 2014

(87) PCT Pub. No.: WO2013/163529
PCT Pub. Date: Oct. 31, 2013

(65) Prior Publication Data
US 2015/0078985 A1    Mar. 19, 2015

Related U.S. Application Data

(60) Provisional application No. 61/639,624, filed on Apr. 27, 2012.

(51) Int. Cl.
*B24D 3/00* (2006.01)
*B24D 3/02* (2006.01)
(Continued)

(52) U.S. Cl.
CPC ........... *C01G 23/07* (2013.01); *C01G 23/047* (2013.01); *C09C 1/3638* (2013.01); *C09K 3/1409* (2013.01); *C01P 2006/11* (2013.01)

(58) Field of Classification Search
USPC .......................................... 51/309, 293, 307
See application file for complete search history.

(56) References Cited

U.S. PATENT DOCUMENTS 3,501,354 A * 3/1970 De Long ................ B23K 35/36
148/23
4,784,841 A * 11/1988 Hartmann .............. C01G 23/07
423/613

(Continued)

FOREIGN PATENT DOCUMENTS

EP          0265551 A1    5/1988
WO     2008057354 A2    5/2008

*Primary Examiner* — James McDonough
(74) *Attorney, Agent, or Firm* — Howard C. Lee

(57) ABSTRACT

TiO₂ based scrubbing granules, and methods of making and using such TiO₂ based scrubbing granules are described. TiO2-based scrubbing granules include granulated TiO₂ and about 0.5% to about 20% dry weight inorganic salt binder. Other TiO₂ based scrubbing granules include unsintered granulated TiO2 and about 0.5% to about 20% dry weight inorganic salt binder. Inorganic salt binder include sodium aluminate. Methods of making TiO₂ based scrubbing granules include i) combining TiO₂ particles with inorganic salt binder to form TiO₂-binder mixture comprising from about 0.5% to about 20% dry weight binder; ii) granulating the TiO2-binder mixture; and drying the granulated TiO₂-binder mixture to form TiO2-based scrubbing granules. Methods of using such TiO₂-based scrubbing granules include introducing TiO₂-based scrubbing granules to remove adherent deposits on an inner surface of a reactor or heat exchanger during processes of forming TiO₂ particles and finishing the formed TiO₂ particles into finished pigment products.

7 Claims, 12 Drawing Sheets

(51) Int. Cl.
*B24D 11/00* (2006.01)
*B24D 18/00* (2006.01)
*C09K 3/14* (2006.01)
*C01G 23/07* (2006.01)
*C09C 1/36* (2006.01)
*C01G 23/047* (2006.01)

(56) References Cited

U.S. PATENT DOCUMENTS

| | | | | |
|---|---|---|---|---|
| 5,266,108 A | * | 11/1993 | Hauck | C01G 23/075 |
| | | | | 106/437 |
| 5,348,914 A | * | 9/1994 | Thometzek | C09C 3/045 |
| | | | | 106/480 |
| 5,372,639 A | * | 12/1994 | Gonzalez | C01B 13/30 |
| | | | | 106/437 |
| 2004/0239012 A1 | * | 12/2004 | Krause | C01G 23/047 |
| | | | | 264/669 |

* cited by examiner

Fig. 1  Prior Art
Step 110
Combining TiO$_2$ particles with binder to form a TiO$_2$ binder mixture
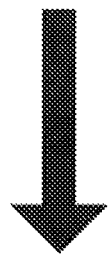
Step 120
Compacting and/or granulating and drying the TiO$_2$-binder mixture
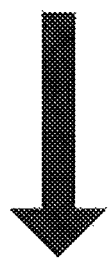
Step 130
Sintering or calcining the TiO$_2$-binder mixture

TIO$_2$ BASED SCRUBBING GRANULES, AND METHODS OF MAKING AND USING SUCH TIO$_2$ BASED SCRUBBING GRANULES

CROSS REFERENCE TO PRIOR APPLICATIONS

This application is a U.S. National Phase application under 35 U.S.C. §371 of International Patent Application No. PCT/US2013/038386,filed Apr. 26, 2013 titled TiO$_2$ BASED SCRUBBING GRANULES, AND METHODS OF MAKING AND USING SUCH TiO$_2$ BASED SCRUBBING GRANULES, and claims priority to provisional application 61/639,624 filed Apr. 27, 2012 titled METHOD OF PRODUCING TiO$_2$ SCRUBS AND THEIR USE IN TiO$_2$ MANUFACTURING PROCESSES, which are incorporated by reference herein in their entirety. The International Application published in English on Oct. 31, 2013 as WO 2013/163529 under PCT Article 21(2).

BACKGROUND

Field of the presently disclosed and/or Claimed inventive concept(s).

This invention includes embodiments relating to titanium dioxide (TiO$_2$) based scrubbing granules, and methods of making and using such TiO$_2$ scrubbing granules. Particularly, the invention includes embodiments relating to TiO$_2$ based scrubbing granules with sodium aluminate binder and various methods of using such TiO$_2$ based scrubbing granules during TiO$_2$ production; and embodiments relating to unsintered TiO$_2$ based scrubbing granules with inorganic metal binder and various methods of using such TiO$_2$ based scrubbing granules during TiO$_2$ production Background of the presently disclosed and/or Claimed inventive concept(s)

Generally, TiO$_2$ particles are produced by a chloride or a sulfate process. In the chloride process, titanium tetrachloride (TiCl$_4$) undergoes vapor phase oxidation to form TiO$_2$ particles as part of a hot gaseous suspension. The hot TiO$_2$ particles, along with other gaseous by-products in the hot gaseous suspension, are passed from a reactor to a heat exchanger. The hot gaseous suspensions are cooled by contact with the inner surface walls of the heat exchanger which have temperatures less than that of the hot gaseous suspension. As the hot TiO$_2$ particles are cooled, the TiO$_2$ particles may deposit on the inner walls of the heat exchanger or reactor and form adherent layer deposits. The adherent layer deposits lower heat transfer efficiency through the inner walls of the heat exchanger and thus reduce cooling efficiencies. Such inefficiencies affect the quality of the formed TiO$_2$ particles and the efficiency of the downstream finishing and surface treatment steps.

In attempts to remove adherent layers, "scrubs" such as sodium chloride (NaCl), silica sand, calcined TiO$_2$ particles, sintered TiO$_2$ particles have been added to the hot TiO$_2$ pigment particles flowing through the reactor and heat exchanger. For example, NaCl scrubs such as U.S. Pat. No. 3,511,308 increase viscosity of TiO$_2$ slurry, thereby lowering the throughput rate in the finishing step. Silica sand scrubs introduce contaminants into the process and may also increase reactor wear and downtime of the process equipment, e.g., the reactor, the heat exchanger, etc.

U.S. Pat. No. 5,266,108 discloses calcined TiO$_2$ scrubs typically prepared by heating the TiO$_2$ particles to a maximum temperature of approximately 1000° C. Unfortunately, such high temperatures decrease the surface area of most known TiO$_2$ scrubs and makes size of scrubs difficult to control. Calcined or sintered TiO$_2$ scrubs also have one or more of the following disadvantages. Calcined or sintered TiO$_2$ scrubs contaminate the finished TiO$_2$ pigments, thus requiring additional processes. Calcined or sintered TiO$_2$ scrubs are difficult to reduce to pigmentary size; and calcined or sintered TiO$_2$ scrubs can affect the dispersion and/or effectiveness of TiO$_2$ finishing processes.

Thus, a need still exists for improved scrubbing mediums, and method of making and using such improved scrubbing mediums.

BRIEF SUMMARY

Embodiments of the present invention meet these and other needs by providing TiO$_2$-based scrubbing granules, and methods of making and using such TiO$_2$-based scrubbing granules.

Accordingly, one aspect of the invention provides TiO$_2$-based scrubbing granules. The TiO$_2$-based scrubbing granules include granulated TiO$_2$ and about 0.5% to about 20% dry weight sodium aluminate binder.

A second aspect of the invention provides TiO$_2$-based scrubbing granules. The TiO$_2$-based scrubbing granules include granulated TiO$_2$ and about 0.5% to about 20% dry weight binder. The binder is selected from a group consisting of sodium aluminate, sodium sulfate, sodium phosphate, sodium silicate, sodium chloride, sodium hexametaphosphate, and aluminum sulfate, and combinations thereof.

A third aspect of the invention provides TiO$_2$-based scrubbing granules. The TiO$_2$-based scrubbing granules include granulated TiO$_2$ and about 0.5% to about 20% dry weight binder and wherein the TiO$_2$-based scrubbing granules are unsintered.

A fourth aspect of the invention provides a method of making TiO$_2$-based scrubbing granules. The method includes: i) combining TiO$_2$ particles with sodium aluminate binder to form a TiO$_2$-binder mixture comprising from about 0.5% to about 20% dry weight binder; ii) granulating the TiO$_2$-binder mixture; and iii) drying the granulated TiO$_2$-binder mixture to form TiO$_2$-based scrubbing granules.

A fifth aspect of the invention provides a method of making TiO$_2$-based scrubbing granules. The method includes: i) combining TiO$_2$ particles with binder to form a TiO$_2$-binder mixture comprising from about 0.5% to about 20% dry weight binder; ii) granulating the TiO$_2$-binder mixture; and iii) drying the granulated TiO$_2$-binder mixture to form TiO$_2$-based scrubbing granules. The binder is selected from a group consisting of sodium aluminate, sodium sulfate, sodium phosphate, sodium silicate, sodium chloride, sodium hexametaphosphate.

A sixth aspect of the invention provides a method of making TiO$_2$-based scrubbing granules. The method includes: i) combining TiO$_2$ particles with a binder to form a TiO$_2$-binder mixture; ii) granulating the TiO$_2$-binder mixture; and iii) drying the granulated TiO$_2$-binder mixture to form TiO$_2$-based scrubbing granules without sintering the TiO$_2$-based scrubbing granules. The binder comprises from about 0.5% to about 20% by dry weight of the TiO$_2$-based scrubbing granules.

A seventh aspect of the invention provides a method of using TiO$_2$-based scrubbing granules. The method includes:
  i. introducing TiCl$_4$ into a TiO$_2$ reaction zone of a reactor to form TiO$_2$ particles;
  ii. introducing TiO$_2$-based scrubbing granules into the reactor or a heat exchanger, thereby resulting in a TiO$_2$ product stream comprising the $TiO_2$-based scrubbing granules and formed $TiO_2$ particles; and iii. cooling the $TiO_2$ product stream via the heat exchanger, wherein the $TiO_2$-based scrubbing granules in the $TiO_2$ product stream removes deposits on an inner surface of the heat exchanger as the $TiO_2$ product stream comprising the $TiO_2$-based scrubbing granules passes through the heat exchanger. The $TiO_2$-based scrubbing granules include granulated $TiO_2$ and about 0.5% to about 20% dry weight sodium aluminate binder.

An eighth aspect of the invention provides a method of using $TiO_2$-based scrubbing granules. The method includes:

i. introducing $TiCl_4$ into a $TiO_2$ reaction zone of a reactor to form $TiO_2$ particles;

ii. introducing $TiO_2$-based scrubbing granules into the reactor or a heat exchanger, thereby resulting in a $TiO_2$ product stream comprising the $TiO_2$-based scrubbing granules and formed $TiO_2$ particles; and iii. cooling the $TiO_2$ product stream via a heat exchanger, wherein the $TiO_2$-based scrubbing granules in the $TiO_2$ product stream removes deposits on an inner surface of the heat exchanger as the $TiO_2$ product stream comprising the $TiO_2$-based scrubbing granules passes through the heat exchanger. The $TiO_2$-based scrubbing granules include granulated $TiO_2$ particles and about 0.5% to about 20% dry weight binder. The binder is selected from a group consisting of sodium aluminate, sodium sulfate, sodium phosphate, sodium silicate, sodium chloride, sodium hexametaphosphate, and aluminum sulfate, and combinations thereof.

A ninth aspect of the invention provides a method making $TiO_2$ particles. The method includes:

i. introducing $TiCl_4$ into a $TiO_2$ reaction zone of a reactor to form $TiO_2$ particles;

ii. introducing unsintered $TiO_2$-based scrubbing granules into the reactor or a heat exchanger, thereby resulting in a $TiO_2$ product stream comprising the $TiO_2$-based scrubbing granules and formed $TiO_2$ particles; and iii. cooling the $TiO_2$ product stream via a heat exchanger, wherein the $TiO_2$-based scrubbing granules in the $TiO_2$ product stream removes deposits on an inner surface of the heat exchanger as the $TiO_2$ product stream comprising the $TiO_2$-based scrubbing granules passes through the heat exchanger. The unsintered $TiO_2$-based scrubbing granules include granulated and about 0.5% to about 20% dry weight binder.

BRIEF DESCRIPTION OF THE DRAWINGS

FIG. 1 is a flow chart of a conventional method of making $TiO_2$-based scrubbing granules;

DETAILED DESCRIPTION

Figure 2:
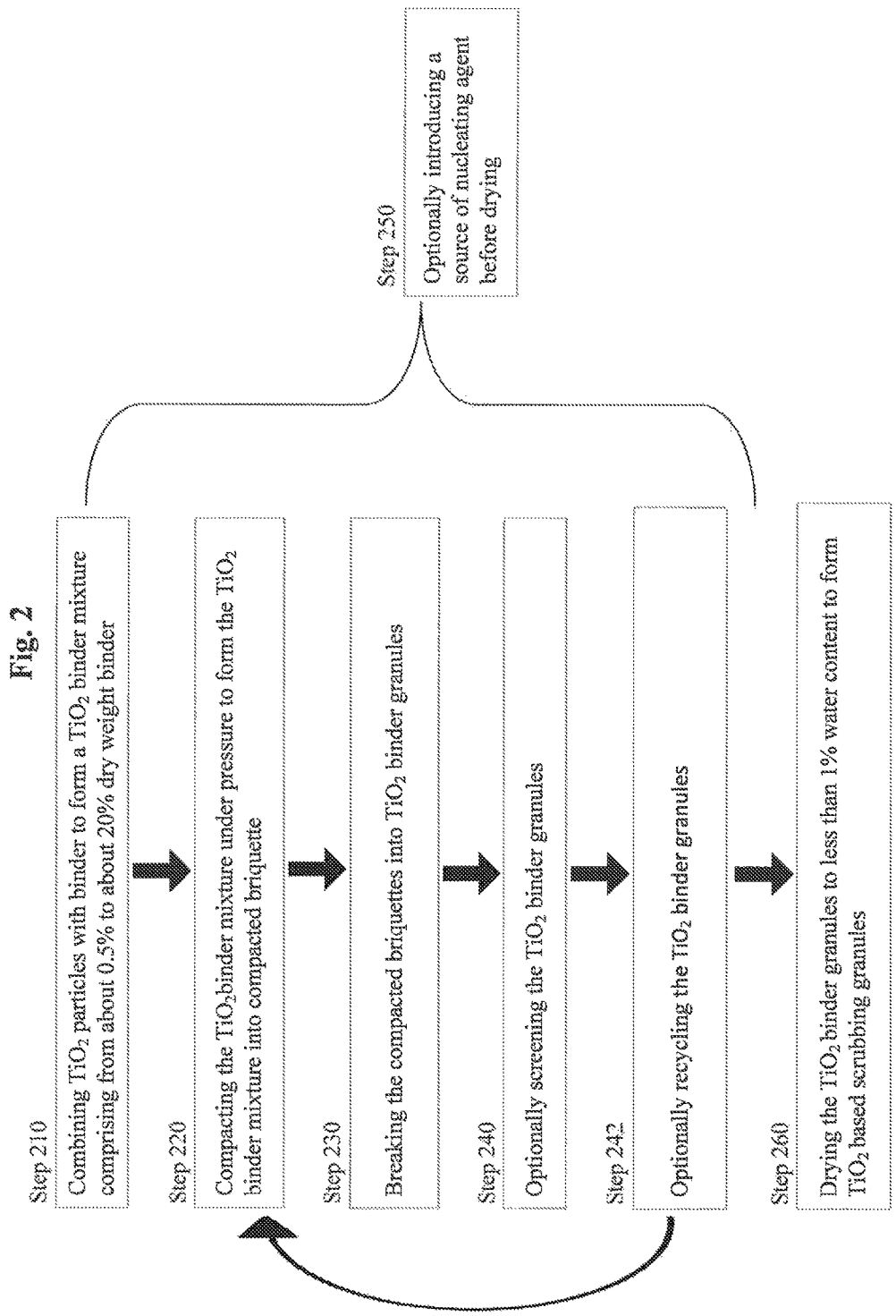
FIG. 2 is a flow chart of a method of making $TiO_2$-based scrubbing granules in accordance with an embodiment of the invention.

In the following description, it is understood that terms such as "top," "bottom," "outward," "inward," and the like are words of convenience and are not to be construed as limiting terms. Reference will now be made in detail to exemplary embodiments of the invention, which are illustrated in the accompanying figures and examples. Referring to the drawings in general, it will be understood that the illustrations are for describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

Definitions

The term calcining refers to the heating up of solids to a high temperature, but below the incipient fusion or melting point temperature of the solids. Calcination can result in thermal transition, solids phase transition, and/or removal of volatile fraction(s) from the solids. The volatile fraction(s) that is removed is bound with the solids, and exclude surface volatiles, such as surface water or surface moisture. The chemical composition of the product is typically different from that of the reactant. One example of calcination includes the thermal decomposition of limestone via the following reaction:

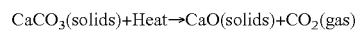

The term sintering refers to the "welding together" and growth of contact area between solid particles at temperatures near the melting point of the solids. The solids are heated up to their incipient fusion temperature (or eutectic point temperature if the solids contain more than one species of compounds). In this heating process, there is a gradual closing of the voids between the particles and densification typically occurs. The solid particles stick together due to partial melting, and form a solid porous mass. Chemical reaction is not taking place, and the chemical composition of the product(s) is substantially the same as the reactant. Examples of sintering include eutectic phase diagrams published in the literature.

Free flowing solids refers to solids capable of flowing out of containers or bins without the aid of flow enhancers, such as bin vibrators, bin inserts, or special flow-enhancing liners on the bin wall. Free flowing solids also refers to the flow of material from the bin, sticky solids and dry powders that tend to adhere strongly to the surface of bins resulting in poor control of material flow. Whereas, with granular solids that do not stick to the walls, the flow is consistent, controlled and hence, called as free flowing.

TIO$_2$-Based Scrubbing Granules

Embodiment 1

An embodiment of the invention includes TiO$_2$-based scrubbing granules. The TiO$_2$-based scrubbing granules include granulated TiO$_2$ and about 0.5% to about 20% dry weight sodium aluminate binder. In another embodiment, the TiO$_2$-based scrubbing granules further include one or more inorganic salts. Non-limiting examples of inorganic metal salts include sodium aluminate, sodium sulfate, sodium phosphate, sodium silicate, sodium chloride, sodium hexametaphosphate, aluminum sulfate, either individually or in combinations of two or more thereof.

In a particular embodiment, the TiO$_2$-based scrubbing granules are dispersible in finished TiO$_2$ pigment during a process of making such finished TiO$_2$ pigment. In yet another embodiment, the TiO$_2$-based scrubbing granules are free flowing. An advantage of free flowing TiO$_2$-based scrubbing granules includes ease of introducing TiO$_2$-based scrubbing granules to a location or place such a reactor or heat exchanger.

In an embodiment, the TiO$_2$-based scrubbing granules are unsintered. In another embodiment, the TiO$_2$-based scrubbing granules are uncalcined. An embodiment includes TiO$_2$ based scrubbing granules having an average size in a range of from about 1 mm to about 25 mm. An embodiment includes TiO$_2$ based scrubbing granules having a bulk density in a range of from about 800 to about 1800 kg/m$^3$.

It should be appreciated that embodiments of the invention include pre-determined and preselected choice of mean size, size distribution, and hardness to provide adequate scrubbing action tailored for specific processes and methodologies. Embodiments of the invention include varying non-limiting parameters such as drying conditions, type of binders, amount of binder, the type of pressure rolls, and amount of pressure applied, either individually and or in combination of two or more thereof as discussed below.

Embodiment 2

In an embodiment of the invention, TiO$_2$-based scrubbing granules include granulated TiO$_2$ and about 0.5% to about 20% dry weight binder. The binder includes one or more inorganic salts such as but not limited to sodium aluminate, sodium sulfate, sodium phosphate, sodium silicate, sodium chloride, sodium hexametaphosphate, and aluminum sulfate, either individually or in combinations of two or more thereof. In a particular embodiment, the binder comprises sodium aluminate. In a particular embodiment, inorganic metal salt includes substantially sodium aluminate. Similar to as described above, in a particular embodiment, the TiO$_2$-based scrubbing granules are dispersible in finished TiO$_2$ pigment during a process of making such finished TiO$_2$ pigment. In yet another embodiment, the TiO$_2$-based scrubbing granules are free flowing.

In an embodiment, the TiO$_2$-based scrubbing granules are unsintered. An embodiment includes TiO$_2$ based scrubbing granules having an average size in a range of from about 1 mm to about 25 mm. An embodiment includes TiO$_2$ based scrubbing granules having a bulk density in a range of from about 800 to about 1800 kg/m$^3$.

Embodiment 3

An embodiment of TiO$_2$-based scrubbing granules include granulated TiO$_2$ and about 0.5% to about 20% dry weight binder and wherein the TiO$_2$-based scrubbing granules are unsintered. In an embodiment, the binder comprises sodium aluminate. In another embodiment, the binder includes one or more inorganic salts such as but not limited to sodium aluminate, sodium sulfate, sodium phosphate, sodium silicate, sodium chloride, sodium hexametaphosphate, and aluminum sulfate, either individually or in combinations of two or more thereof. In a particular embodiment, the binder comprises substantially sodium aluminate. In a particular embodiment, the binder comprises greater than 90% by weight sodium aluminate based on total weight of the binder in the TiO$_2$-based scrubbing granules.

Similar to as described above, in a particular embodiment, the TiO$_2$-based scrubbing granules are dispersible in finished TiO$_2$ pigment during a process of making such finished TiO$_2$ pigment. In yet another embodiment, the TiO$_2$-based scrubbing granules are free flowing. An embodiment includes TiO$_2$ based scrubbing granules having an average size in a range of from about 1 mm to about 25 mm. An embodiment includes TiO$_2$ based scrubbing granules having a bulk density in a range of from about 800 to about 1800 kg/m$^3$.

Method of Making TIO$_2$-Based Scrubbing Granules

Embodiment of the invention provide methods of making TiO$_2$-based scrubbing granules as described above. For illustration and not limitation, an embodiment of making TiO$_2$-based scrubbing granules is compared to conventional methods as depicted in FIG. 1. A conventional method of making TiO$_2$-based scrubbing granules includes Step 110 is combining TiO$_2$ particles with binder to form a TiO$_2$-binder mixture. The binder does not include sodium aluminate as shown in FIG. 1. Step 120 is compacting, and or granulating and drying the TiO$_2$-binder mixture. Step 130 is sintering or calcining the TiO$_2$-binder mixture. In some conventional methods, TiO$_2$-binder mixture is sintered or calcined, either individually or both.

In contrast to conventional FIG. 1, FIG. 2 describes embodiments of the invention of making TiO$_2$-based scrubbing granules. FIG. 2 is a flow chart of an embodiment of a method of making TiO$_2$-based scrubbing granules; and the method is not limited by the order or frequency of the steps unless expressly noted.

The method includes Step 210 combining TiO$_2$ particles with binder to form a TiO$_2$-binder mixture comprising from about 0.5% to about 20% dry weight binder.

The method is not limited by the shape, size and kind of TiO$_2$ particles. Non-limiting examples of TiO$_2$ particles used to make TiO$_2$ based scrubbing granules include rutile, anatase, and brookite, either individually or in a combination of two or more thereof. In an embodiment, the TiO$_2$ particles include rutile phase or anatase phase, either individually or in a combination of two or more thereof. Furthermore, the TiO$_2$ particles used to make TiO$_2$ based scrubbing granules may be produced from the chloride or sulfate process, either individually or in combination.

In an embodiment, TiO$_2$ particles are pigmentary sized particles having an average size greater than 0.20 micron. Furthermore, such TiO$_2$ pigment particles may be in the form of a finished or intermediate product, either individually or in combinations.

Non-limiting embodiments of binders include as described above. A particular embodiment of making TiO$_2$-based scrubbing granules includes providing sodium aluminate (NaAlO$_2$) as binder. Using sodium aluminate binder may have unexpected advantage of TiO$_2$-based scrubbing granules dispersing in TiO$_2$ slurry and minimizing contamination in downstream processes.

In an embodiment, TiO$_2$ pigment particles are premixed with sodium aluminate binder and water such that the binder comprises from about 0.5% to about 5% NaAlO$_2$ dry weight of the TiO$_2$-sodium aluminate binder mixture and moisture content is about 4%-8%. Approximate mixing equipment such as a pin mixer or turbulizer may be used to mix TiO$_2$ and binder to make the TiO2-binder mixture. It should be appreciated that embodiments of the invention include introducing and adjusting the type and amount of binder to achieve a desired strength.

It should be also appreciated that embodiments of the invention include introducing a plurality of binders which differ from each other. Furthermore, the plurality of binders may independently have various characteristics which differ from each other.

Optimally, Step 220 includes compacting the TiO$_2$-binder mixture under pressure to form the TiO$_2$-binder mixture into compacted briquettes. For illustration and not limitation, TiO2-binder mixture may be passed through a compacting apparatus such as standard compactors or pressure rolls available in the market Embodiments of the invention are not limited by how the TiO$_2$-binder mixture is compacted or by the form, size or shape of the compacted briquettes. The compacted briquettes can be formed by any suitable method. An embodiment includes subjecting TiO$_2$-binder mixture to sufficient pressure to compact. The TiO$_2$-binder mixture can be compacted by pressure by any suitable means such as, but not limited to, pressure rolls and presses. A specific embodiment includes counter-rotating pressure rolls. If desired, the pressure rolls can have depressions on the surface of the rolls to facilitate compaction. Non-limiting examples of the form of compacted briquettes include sticks, almonds, bricks, blocks, etc. either individually or in a combination of two or more forms. Furthermore, properties of each compacted briquettes are also independent of other compacted briquettes. For example, the size or shape of the compacted briquettes may have varying dimensions of depth, width, length and may independently vary from embodiment to embodiment.

The compacted briquettes can be used as is, if the particle size of the compacted briquettes is as desired. If the size of the compacted TiO$_2$ binder briquettes is too large, optimally, Step 230 includes breaking the compacted TiO$_2$ binder briquettes into TiO$_2$ binder granules.

Compacted TiO$_2$ binder briquettes can be broken into smaller size by flake breaker or similar equipment to form TiO$_2$ binder granules. In an embodiment, the compacted briquettes are broken into TiO$_2$-binder granules having average size in a range of from about 1 mm to about 25 mm. It should be appreciated that the method includes repeating Step 220 compacting the TiO$_2$-binder mixture into compacted briquettes and Step 230 breaking the compacted TiO$_2$ into TiO$_2$-binder granules as desired.

Step 240 optimally includes screening the TiO$_2$-binder granules. The TiO$_2$ binder-granules may be screened based on one or more desired specifications such as size specification and reprocessed. For example, TiO$_2$-binder granules may be selected by an average size in a range of from about 1 mm to about 25 mm. Step 242 optionally includes recycling the TiO$_2$ binder granules. Oversized TiO$_2$ granules such as about >25 mm in size may be passed through milling equipment and undersized granules such as about <1 mm may be recycled to a compaction unit to recompact into compacted briquettes. Upon screening, TiO$_2$-binder granules of desired size range from about 1 mm to about 25 mm are collected and passed on to be part of the TiO$_2$ based scrubbing granules.

Step 260 includes drying the TiO$_2$ binder granules to less than 1% water content to form TiO$_2$ based scrubbing granules. In a particular embodiment, Step 260 includes drying the TiO$_2$ binder granules that have been screened for a desired specification such as size to less than 1% water content to form TiO$_2$ based scrubbing granules. Any suitable drying unit may be used to dry the TiO$_2$ binder granules and invention is not restricted by how the TiO$_2$ binder granules are dried. In an embodiment, TiO$_2$ binder granules are dried to achieve <1% moisture thereby improving the strength of the TiO$_2$ granules. For example the TiO$_2$-binder mixture may be dried by to heating at a temperature in a range of from about 90° C. to about 700° C. In an embodiment, drying temperature may be in a range, such as but not limited to from about 90° C. to about 200° C. Additionally, the temperature may be varied and/or selected in a range or value to achieve a desired strength.

Method of making TiO$_2$-based scrubbing granules optionally, includes Step 250 introducing at least some source of nucleating agent to the TiO$_2$-binder mixture before step 260 drying the TiO$_2$-binder mixture into TiO$_2$ based scrubbing granules. An embodiment includes introducing nucleating agents from 1A metals of the periodic table, either individually or in a combination of two or more thereof. Example of group 1A metals include salts and halides of cesium, either individually or combinations of two or more thereof. The method is not limited by the sequential order or frequency of the steps unless expressly as shown in FIG. 2. An embodiment includes Step 250 introducing nucleating agent simultaneously with step 210 or 220. Another embodiment includes Step 260 introducing nucleating agent sequentially before or after step 220 compacting the TiO$_2$-binder mixture. An embodiment includes Step 250 introducing nucleating agent before step 220 compacting the TiO$_2$-binder mixture. It should also be appreciated that embodiments of the invention include introducing a plurality of nucleating agents which differ from each other. Furthermore, the plurality of nucleating agents may independently have various characteristics. A particular embodiment includes introducing a plurality of nucleating agents simultaneously or sequentially before Step 260 drying.

Embodiment 1

As shown in FIG. 2, a particular embodiment of making TiO$_2$-based scrubbing granules includes: i) combining TiO$_2$ particles with sodium aluminate binder to form a TiO$_2$-binder mixture comprising from about 0.5% to about 20% dry weight binder; ii) granulating the TiO$_2$-binder mixture; and iii) drying the granulated TiO$_2$-binder mixture to form TiO$_2$-based scrubbing granules.

Embodiment 2

As shown in FIG. 2, another particular embodiment of making $TiO_2$-based scrubbing granules includes: i) combining $TiO_2$ particles with binder to form a $TiO_2$-binder mixture comprising from about 0.5% to about 20% dry weight binder; ii) granulating the $TiO_2$-binder mixture; and iii) drying the granulated $TiO_2$-binder mixture to form $TiO_2$-based scrubbing granules. The binder is selected from a group consisting of sodium aluminate, sodium sulfate, sodium phosphate, sodium silicate, sodium chloride, sodium hexametaphosphate.

Embodiment 3

In contrast to conventional method as shown in FIG. 1, embodiments of the invention include making $TiO_2$-based scrubbing granules without sintering or calcining the $TiO_2$-based scrubbing granules. A particular embodiment includes: i) combining $TiO_2$ particles with a binder to form a $TiO_2$-binder mixture; ii) granulating the $TiO_2$-binder mixture; and iii) drying the granulated $TiO_2$-binder mixture to form $TiO_2$-based scrubbing granules without sintering the $TiO_2$-based scrubbing granules as shown in FIG. 2. The binder comprises of from about 0.5% to about 20% by dry weight of the $TiO_2$-based scrubbing granules.

Similar to the embodiments of $TiO_2$-based scrubbing granules described above, in an embodiment, the bulk density of the unsintered $TiO_2$ scrubbing granules formed is in the range of from about 800 to about 1800 kg/m$^3$. In a particular embodiment, the unsintered $TiO_2$-based scrubbing granules are dispersible in $TiO_2$ slurry during a process of making finished $TiO_2$ pigment. In another embodiment, the unsintered $TiO_2$-based scrubbing granules are mixed with finished $TiO_2$ pigment during a process of making such finished $TiO_2$ pigment. In yet another embodiment, the unsintered $TiO_2$-based scrubbing granules are free flowing.

Method of Using $TiO_2$-Based Scrubbing Granules

Figure 3:
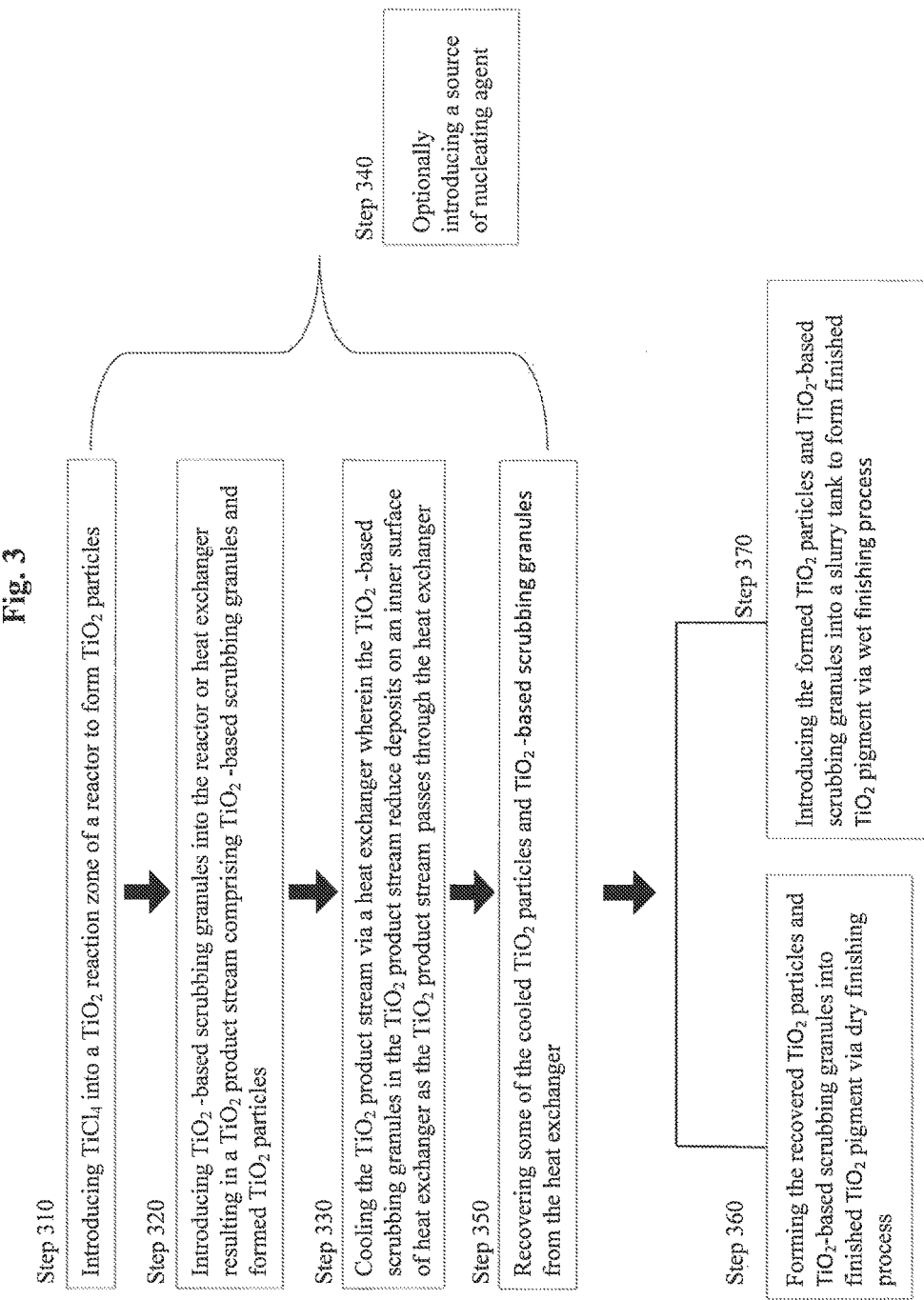
FIG. 3 is a flow chart of a method of using $TiO_2$-based scrubbing granules in accordance with an embodiment of the invention.

Embodiments of the invention also include methods of using the $TiO_2$ based scrubbing granules described above such as to remove adherent deposits and make finished $TiO_2$ pigment. FIG. 3 is a flow chart of an embodiment of a method of removing adherent deposits and making finished $TiO_2$ pigment using one or more of the above described $TiO_2$-based scrubbing granules. Step 310 includes introducing $TiCl_4$ into a $TiO_2$ reaction zone of a reactor to form $TiO_2$ particles. It is understood to one of ordinary skill in the art that $TiCl_4$ is oxidized in the reaction zone of the reactor to form $TiO_2$ particles. Step 320 includes introducing $TiO_2$-based scrubbing granules into the reactor or a heat exchanger resulting in a $TiO_2$ product stream comprising the $TiO_2$-based scrubbing granules and formed $TiO_2$ particles.

The method is not limited by the order or frequency of the steps unless expressly noted. As shown in FIG. 3, the method is not limited by sequential order or frequency of Step 310 and 320. An embodiment of the method includes introducing $TiCl_4$ and $TiO_2$-based scrubbing granules into the reactor simultaneously. Another embodiment includes introducing $TiCl_4$ and $TiO_2$-based scrubbing granules into the reactor sequentially.

Embodiments of the invention include Step 320 introducing $TiO_2$-based scrubbing granules into the reactor before, during or after Step 310 introducing $TiCl_4$ into a $TiO_2$ reaction zone. In a particular embodiment, a plurality of $TiO_2$ based scrubbing granules which differ from each other are introduced into the reactor before, or after introducing $TiCl_4$ into the $TiO_2$ reaction zone.

In a sequential embodiment, the method include Step 320 introducing $TiO_2$-based scrubbing granules into the reactor before Step 310 introducing $TiCl_4$ into the $TiO_2$ reaction zone. Another embodiment includes Step 320 introducing $TiO_2$-based scrubbing granules into the reactor during Step 310 introducing $TiCl_4$ into $TiO_2$ reaction zone. Another embodiment includes Step 320 introducing $TiO_2$-based scrubbing granules into the reactor after Step 310 introducing $TiCl_4$ into the $TiO_2$ reaction zone.

An embodiment includes introducing $TiO_2$-based scrubbing granules having about 0.5% to about 20% dry weight binder; and the binder includes sodium aluminate, sodium sulfate, sodium phosphate, sodium silicate, sodium chloride, sodium hexametaphosphate, and aluminum sulfate, either individually or in a combination of two or more thereof. In a particular embodiment, the method includes introducing $TiO_2$-based scrubbing granules having about 0.5% to about 20% dry weight sodium aluminate binder.

It should be appreciated embodiments of the invention include methods of removing adherent deposits by introducing embodiments of the $TiO_2$-based scrubbing granules described above to one or more locations such as a reactor and or a heat exchanger.

In an embodiment, a plurality of $TiO_2$ based scrubbing granules which differ from each other are introduced into the reactor or heat exchanger. Furthermore, the plurality of $TiO_2$ based scrubbing granules may have various characteristics.

Embodiment 1

An embodiment includes introducing unsintered $TiO_2$-based scrubbing granules into the reactor. In an embodiment, the unsintered $TiO_2$-based scrubbing granules have from about 0.5% to about 20% dry weight binder; and the binder includes one or more sodium aluminate, sodium sulfate, sodium phosphate, sodium silicate, sodium chloride, sodium hexametaphosphate, and aluminum sulfate, either individually or in a combination of two or more thereof. In a particular embodiment, the unsintered $TiO_2$-based scrubbing granules have from about 0.5% to about 20% dry weight sodium aluminate binder.

In an embodiment of the invention, the introduced unsintered $TiO_2$ scrubbing granules have an average size in a range from about 1 mm to about 25 mm. It should be appreciated that embodiments of the invention include predetermined and preselected choice of size, distribution, and hardness to provide adequate scrubbing action tailored for specific process and/or methodology. Embodiments of the invention include varying non-limiting parameters such as drying conditions, binder, amount of binder, type of pressure rolls, and amount of pressure applied, either individually and or in combination of two or more thereof as discussed below.

In one embodiment, the bulk density of the unsintered $TiO_2$ based scrubbing granules introduced into the reactor or heat exchanger is in a range of from about 800 to about 1800 kg/m$^3$. In a particular embodiment, the $TiO_2$ based scrubbing granules are generally free flowing to simplify introduction of such $TiO_2$ based scrubbing granules into reactor and/or the heat exchanger.

Embodiment 2

In an embodiment of the invention, the introduced $TiO_2$-based scrubbing granules include granulated $TiO_2$ and about 0.5% to about 20% dry weight binder. The binder includes one or more inorganic salts such as but not limited to sodium aluminate, sodium sulfate, sodium phosphate, sodium silicate, sodium chloride, sodium hexametaphosphate, and aluminum sulfate, either individually or in combinations of two or more thereof. In a particular embodiment, the binder comprises sodium aluminate.

Similar to as described above, in an embodiment, the $TiO_2$-based scrubbing granules are unsintered. In another embodiment, the TiO2-based scrubbing granules further include one or more inorganic salts. Examples of inorganic metal salt include sodium aluminate, sodium sulfate, sodium phosphate, sodium silicate, sodium chloride, sodium hexametaphosphate, aluminum sulfate, either individually or in combinations of two or more thereof.

In an embodiment of the invention, the $TiO_2$-based scrubbing granules have an average size in a range of from about 1 mm to about 25 mm. In one embodiment, the bulk density of the $TiO_2$-based scrubbing granules is in a range of from about 800 to about 1800 $kg/m^3$. The $TiO_2$-based scrubbing granules are generally but without limitation, free flowing which facilitates feeding of $TiO_2$-based scrubbing granules into process equipments such as reactors and heat exchangers.

Step 330 includes cooling the $TiO_2$ product stream via a heat exchanger. The $TiO_2$-based scrubbing granules in the $TiO_2$ product stream removes deposits from an inner wall of the heat exchanger as the $TiO_2$ product stream comprising the $TiO_2$-based scrubbing granules passes through the heat exchanger. The $TiO_2$ based scrubbing granules remove deposits or residues within apparatus such as reactors and heat exchangers used in the production of $TiO_2$ pigment particles via a chloride process as described here. In addition to removing deposits, $TiO_2$ based scrubbing granules also increase and/or maintaining heat transfer efficiencies through the inner walls of the heat exchanger.

Embodiments of the invention include adjusting and varying the amount of $TiO_2$ based scrubbing granules that is introduced (Step 320) to remove adherent layer deposits depending upon particular processing conditions, procedures, functional limitations, etc. within the scope and skills of one of ordinary skill in the art given. An embodiment includes introducing one or more combinations of $TiO_2$ based scrubbing granules with selected characteristics to provide a predetermined scrubbing efficiency. Furthermore, the introduced $TiO_2$-based scrubbing granules with the selected characteristics may be altered or changed in response to a change in the predetermined scrubbing efficiency. An embodiment includes increasing or decreasing the amount of introduced $TiO_2$ based scrubbing granules in response to one or more change in a scrubbing efficiency, either individually or combinations thereof. For example, an embodiment includes decreasing the amount of introduced $TiO_2$ based scrubbing granules as accumulated adherent deposits on the inner wall of the heat exchanger or reactor decrease or vice versa. Amount of scrubbing granule introduced may also be adjusted based upon the temperature limit of downstream equipment i.e. filter inlet temperatures controls feeding rate of scrubs.

In an embodiments, $TiO_2$ based scrubbing granules are introduced into the reactor and/or heat exchanger in the range from about 0.5 to about 20 wt. % based on total $TiO_2$ particle production rate in the reactor. In another embodiments, $TiO_2$-based scrubbing granules are introduced in a range from about 1 to about 10 wt. % based on total $TiO_2$ particle production rate in the reactor, to remove accumulated adherent layers and thereby improves heat transfer efficiency. In yet another embodiment, $TiO_2$ scrubbing granules are introduced in a range from about 1 to about 5 wt. %, based on total TiO2 particle production rate in the reactor. In an embodiment, $TiO_2$ based scrubbing granules are introduced in an amount such that the reaction mass exiting the heat exchanger will be at a temperature compatible with downstream process equipment such as cyclones, filters, and screw conveyers.

Furthermore, embodiments of the invention optionally include Step 350 introducing a nucleating agent, such as from 1A metals of the periodic table, either individually or in a combination of two or more thereof. Non-limiting examples of nucleating agents include salts and halides of cesium, either individually or in combinations of two or more thereof of. The method is not limited by the order or frequency of the steps unless expressly noted. As shown in FIG. 3, the method is not limited by sequential order or frequency of Step 350.

Optionally, embodiments include Step 350 introducing nucleating agent before, during or after step 320 introducing $TiO_2$-based scrubbing granules into the reactor. An embodiment of the method includes Step 350 introducing nucleating agent and step 320 introducing $TiO_2$-based scrubbing granules into the reactor simultaneously. An embodiment of the method includes Step 350 introducing nucleating agent and step 320 introducing $TiO_2$-based scrubbing granules into the reactor sequentially.

A sequential embodiment includes Step 350 introducing nucleating agent before Step 320 introducing $TiO_2$-based scrubbing granules into the reactor. Another sequential embodiment includes Step 350 introducing nucleating agent after Step 320 introducing $TiO_2$-based scrubbing granules into the $TiO_2$ reaction zone. It should be appreciated that the method includes repeating Step 350 as desired, simultaneously or sequentially.

An embodiment includes introducing nucleating agents from 1A metals of the periodic table, either individually or in a combination of two or more thereof. Example of group 1A metals includes salts and halides of cesium. Salts or halides of cesium may control or reduce the particle size distribution of the $TiO_2$ finished product. It should be appreciated that one or more group 1A metal nucleating agents can also be used instead of, or as a mixture with KCl as nucleating agents.

Step 340 optionally includes recovering the cooled $TiO_2$ particles and $TiO_2$-based scrubbing granules from the $TiO_2$ product stream after having passed through the heat exchanger. The recovered cooled $TiO_2$ particles and $TiO_2$-based scrubbing granules may be recovered such as via a bag filter which separates solid $TiO_2$ particles from gas. Embodiments of the invention also include various finishing processes to form the recovered $TiO_2$ particles and $TiO_2$-based scrubbing granules into finished $TiO_2$ pigment.

A finishing process includes Step 360 forming some of the recovered $TiO_2$ particles and $TiO_2$-based scrubbing granules into finished $TiO_2$ pigment via dry finishing process.

Another finishing process includes Step 370 introducing some of the recovered $TiO_2$ particles and $TiO_2$-based scrubbing granules into a slurry tank to form finished $TiO_2$ pigment via wet finishing process. Unexpected advantages of using $TiO_2$ based scrubbing granules include one or more of the following. In an embodiment, the $TiO_2$-based scrubbing granules are dispersible in the aqueous slurry and disperse into $TiO_2$ particles such that the $TiO_2$-based scrubbing granules do not need to be removed. The $TiO_2$ scrubbing granules are capable of being dispersed within the aqueous slurry without introducing foreign contaminants or oversized $TiO_2$. The $TiO_2$-based scrubbing granules may also be interspersed within the finished $TiO_2$ pigment. Thus, embodiments include finished $TiO_2$ pigment with interdispersed $TiO_2$-based scrubbing granules.

Furthermore, the $TiO_2$-based scrubbing granules may be interspersed within the finished $TiO_2$ pigment without affecting the quality of the finished $TiO_2$ pigment. As the $TiO_2$-based scrubbing granules do not significantly degrade or change the physical and or chemical functionality of finished $TiO_2$ pigment, the $TiO_2$-based scrubbing granules have the unexpected advantages of not needing to be separated from the finished $TiO_2$ pigment, not needing to be recycled, and not needing further processing. An embodiment of the invention includes not separating $TiO_2$-based scrubbing granules from the finished $TiO_2$ pigment and the finished $TiO_2$ pigment may be sold and/or used with the $TiO_2$-based scrubbing granules as a component thereof.

Furthermore, Applicant has also unexpectedly discovered that NaCl or silica sand scrub may be reduced or replaced with one or more embodiments of $TiO_2$ based scrubbing granules of the present inventions. NaCl scrubs increase viscosity of $TiO_2$ slurry, thereby lowering the throughput rate in the finishing step. Silica sand scrubs introduce contaminants into the process and may also increase reactor wear and downtime of the process equipments such as reactors and heat exchangers. An embodiment includes $TiO_2$ based scrubbing granules substantially free of NaCl. An embodiment includes $TiO_2$ based scrubbing granules substantially free of silica sand. Unexpected advantages include improved throughput rate in the finishing step and increased operating life of process equipment the reactor, the heat exchanger, etc.

Another unexpected advantage of embodiments of $TiO_2$ based scrubbing granules of the present invention includes minimizing trace metal pick-up by $TiO_2$ particles. Embodiments of $TiO_2$ based scrubbing granules are not as hard as conventional silica sand or sintered $TiO_2$ as shown in FIG. 1 which tends to abrade the walls of process equipments such as reactors and heat exchangers and result in metal pick affecting the quality of finished $TiO_2$ product.

EXAMPLES

The following examples illustrate the features of embodiments of the invention and are not intended to limit the invention thereto.

Experimental Results and Analysis $TiO_2$ pigment particles and binder were mixed to form a $TiO_2$-binder mixture; and $TiO_2$-binder mixture was compacted to form various types of $TiO_2$-based scrubbing granules in studies.

Lab studies were conducted on two compaction processes, pressure roll compaction using an L-83 compactor from Fitzpatrick Company and compaction using a lab scale DISPERMAT® from VMA-Getzmann. Binders such as sodium aluminate ($NaAlO_2$), sodium silicate ($Na_2SiO_3$), and sodium chloride (NaCl) were selected for study. Crush strength tests were used to qualitatively compare TiO2-based scrubbing granules in accordance with embodiments of the invention with comparative calcined $TiO_2$ scrubs examples A and B. Comparative calcined $TiO_2$ scrubs examples A and B are calcined sulfate $TiO_2$ scrub materials with different additives and at calcination temperature of 970° C. to 1020° C. Such calcined $TiO_2$ scrub materials were manufactured by sulfate $TiO_2$ manufacturing process. Pressure compaction with the L-83 compactor showed that $TiO_2$-based scrubbing granules in accordance with embodiments of the invention exhibited similar or higher strength than comparative examples A and B calcined $TiO_2$ scrubs. Lab studies demonstrate that characteristics and quality of the $TiO_2$-based scrubbing granules in accordance with embodiments of the invention described above may be affected by, for example, the choice of binder, binder concentration, roll pressure, premixing of binder and pigment prior to pressure rolling, initial moisture content, drying temperature, recycling of fines, either individually or combinations thereof.

Pressure Compaction

Pressure compaction was performed using a Pilot scale pressure roller (L-83 compactor from The Fitzpatrick Company). In a test procedure, an appropriate amount of binder and $TiO_2$ particles were premixed to form $TiO_2$-binder mixture in accordance with embodiments of the invention described above. $TiO_2$-binder mixture was placed on a roller mill for about 45 minutes to achieve uniform mixing of the binder and $TiO_2$ pigment. The $TiO_2$-binder mixture was then compacted via a pressure roller at 69 barg roll pressure and at 5 rpm roll speed to form compacted briquettes. The compacted briquettes were then dried in lab oven at 100 C overnight. The compacted briquettes were dried such that it contains <1% moisture. The dried compacted briquettes were then sieved and briquettes greater than 3 mm were selected for crush strength analysis. Compacted briquettes of 3 mm and above were chosen so that a qualitative comparison of crush strength analysis can be done with Cristal A and Cristal B calcined scrubs. Results from the screening experiments are discussed below.

Sodium Chloride as Binder

Figure 4:
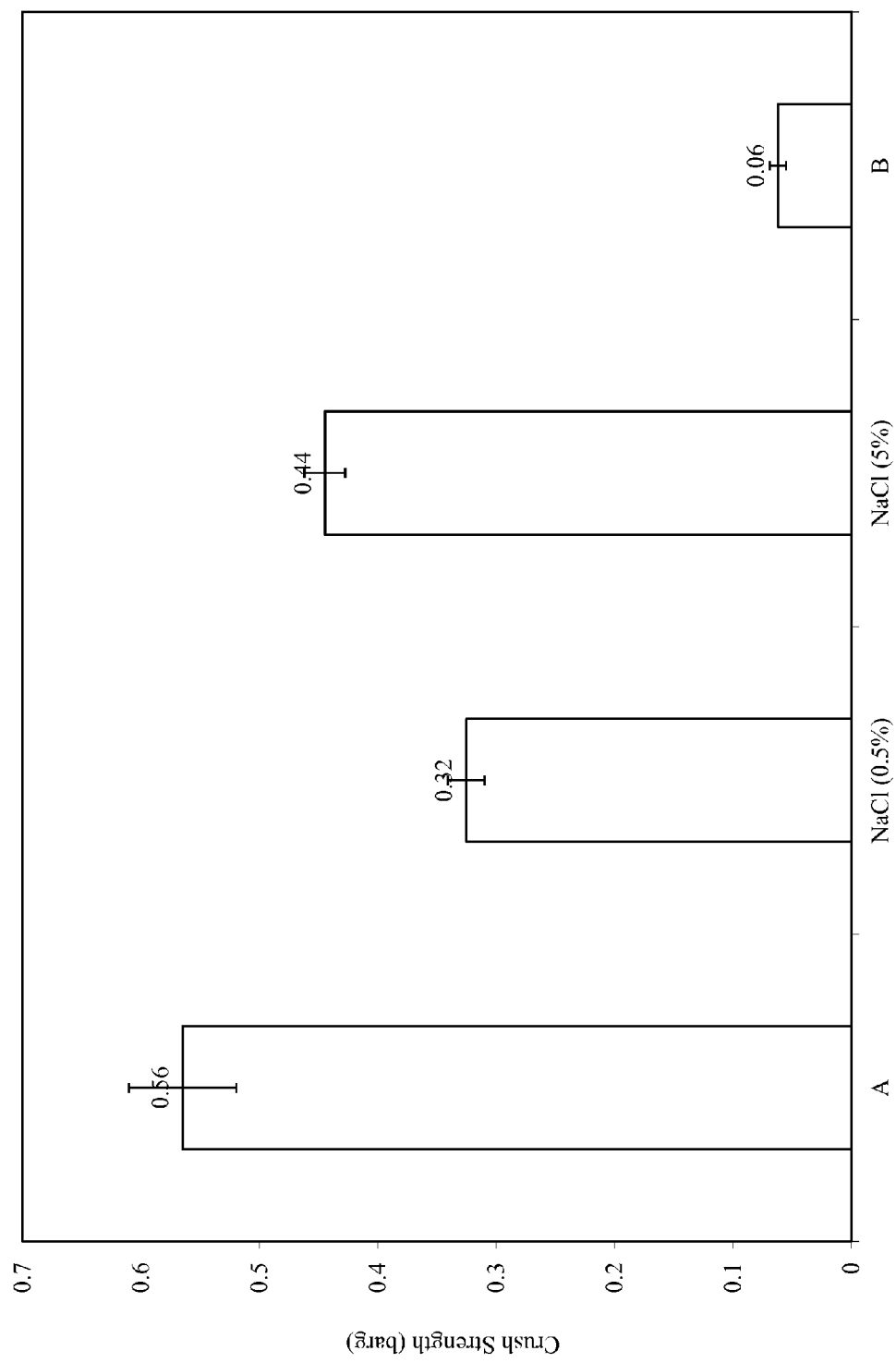
FIG. 4 compares crush strengths of comparative examples calcined $TiO_2$ scrubs A and B and $TiO_2$ bases scrub granules with NaCl binder in accordance with an embodiment of the invention.

FIG. 4 shows the crush strength values for compacted briquettes formed with respectively 0.5% and 5% NaCl binder compared to the comparative example A and B calcined $TiO_2$ scrubs. An increase in strength of the compacted briquettes was observed with increase in binder concentration from 0.5% to 5%. However, the average crush strength in both cases was lower than the crush strength of comparative example A calcined $TiO_2$ scrub.

Sodium Aluminate as Binder

Figure 5:
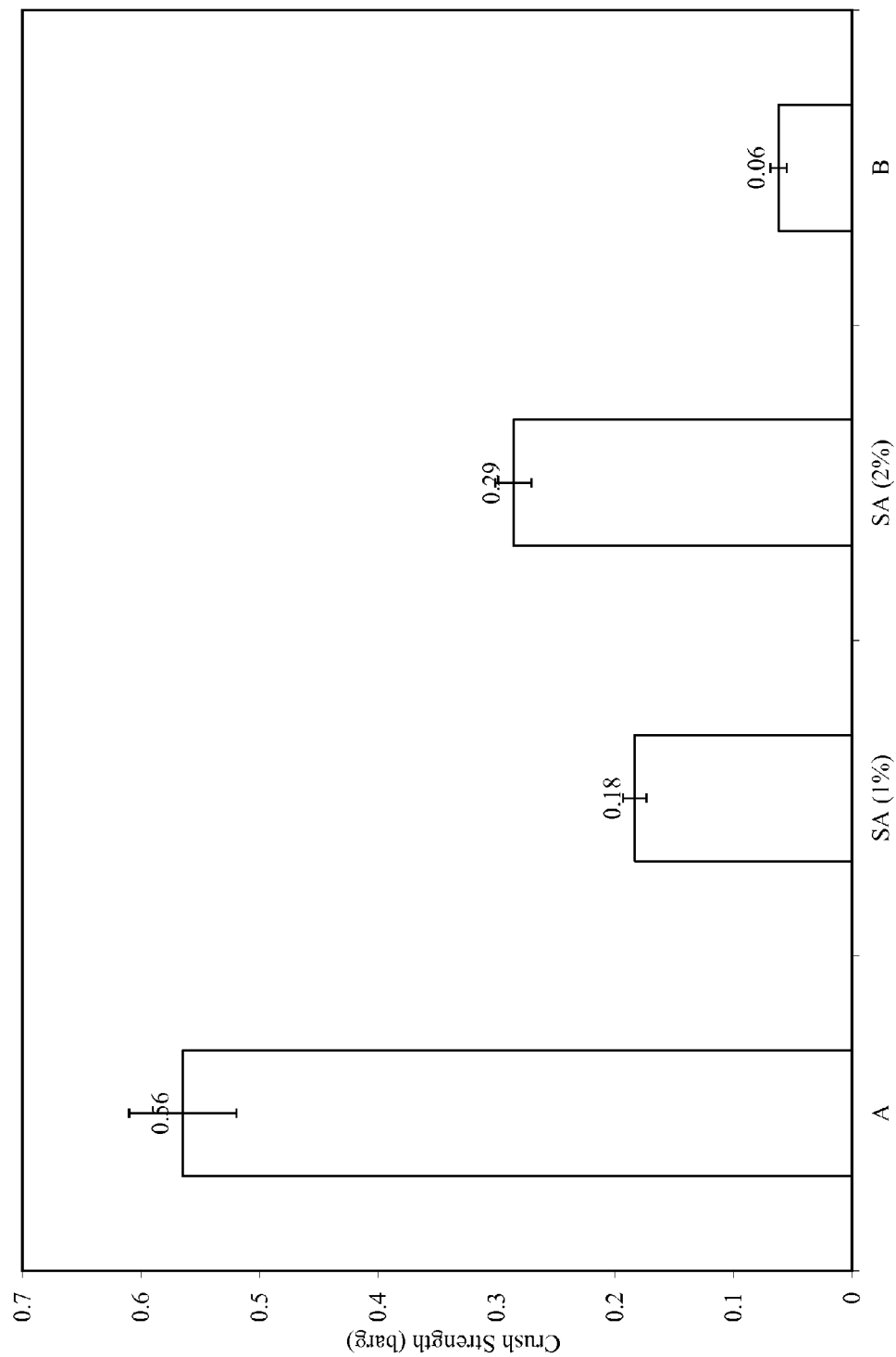
FIG. 5 compares crush strengths of the same comparative examples calcined $TiO_2$ scrubs A and B with $TiO_2$ based scrub granules with sodium aluminate as binder without recycle in accordance with an embodiment of the invention.

FIG. 5 shows the crush strength values compacted briquettes formed with respectively 1% and 2% sodium aluminate ("SA") binder compared to the comparative A and B calcined $TiO_2$ scrubs. Again, an increase in strength of the compacted briquettes was observed with increase in binder concentration.

Effect of Premixing

Figure 6:
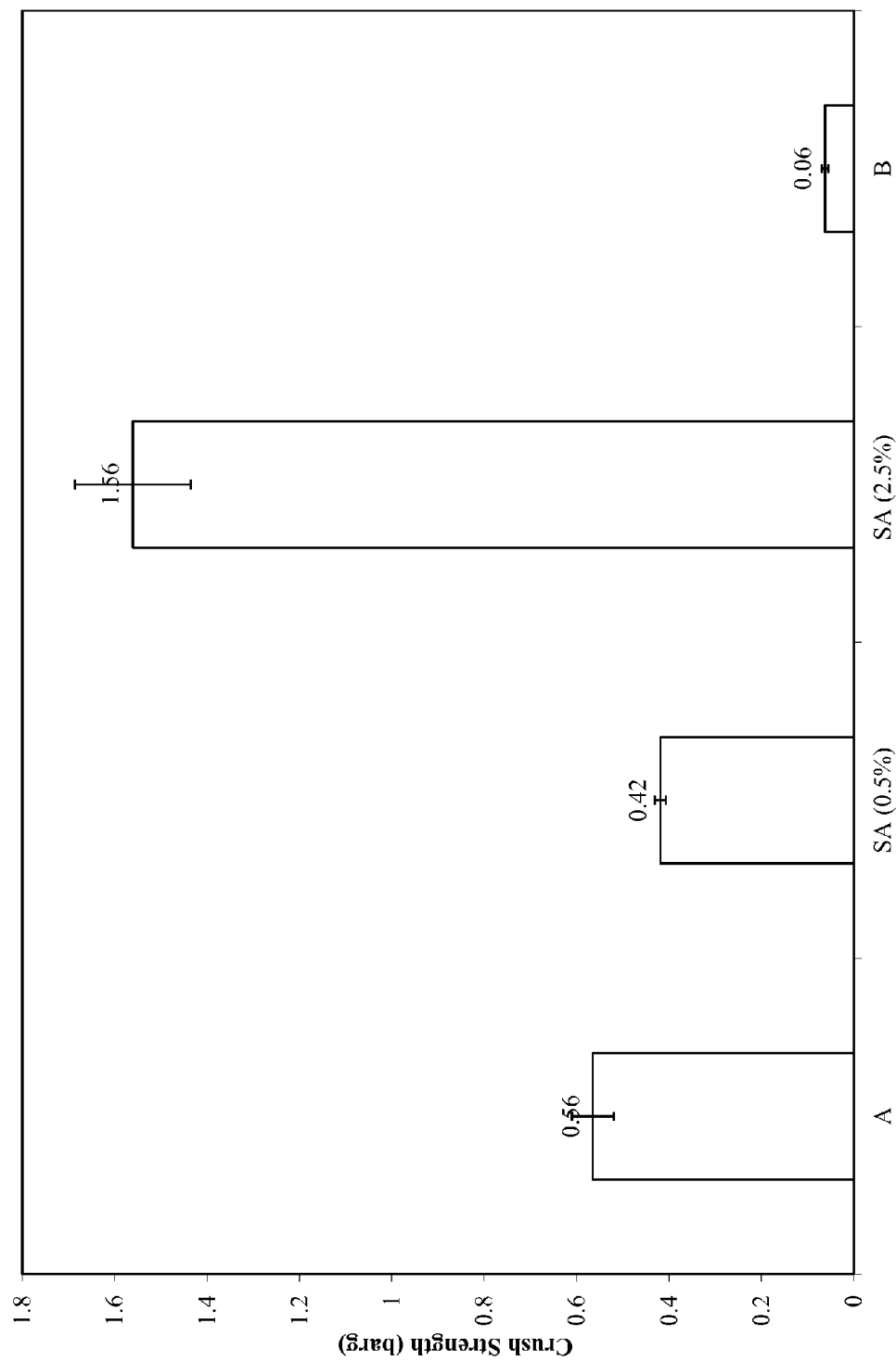
FIG. 6 compares crush strengths of the same comparative examples calcined $TiO_2$ scrubs A and B with $TiO_2$ based scrub granules with sodium aluminate as binder with multiple recycle in accordance with an embodiment of the invention.

Binder and $TiO_2$ pigment particles were premixed in batches using a mixer DISPERMAT™. During mixing, water was added to attain an initial moisture content of about 7%. With 2.5% sodium aluminate as binder, the average crush strength of compacted briquettes was about three times of the comparative A calcined $TiO_2$ scrubs as shown in FIG. 6. The term "compacts" as used herein and in the figures refers to briquettes produced by pressure rolling. The briquettes are broken down to granules of required specification. Comparison of FIGS. 5 and 6 shows significant increase in the crush strength of [compacted briquettes formed by premixing of sodium aluminate ("SA") binder and $TiO_2$ pigment prior to pressure rolling.

Effect of Roll Pressure and Recycle

The effect of roll pressure and recycling of fines on the quality of briquettes that are formed was studied. 2.5% Sodium aluminate binder (based on previous results with higher crush strength) and $TiO_2$ pigment particles were premixed and an initial moisture content of about 7% was achieved. Effect of roll pressures of 13.8 barg, 34.5 barg, and 69 barg and recycle of fines or briquettes smaller than 3.3 mm were studied.

Figure 7:
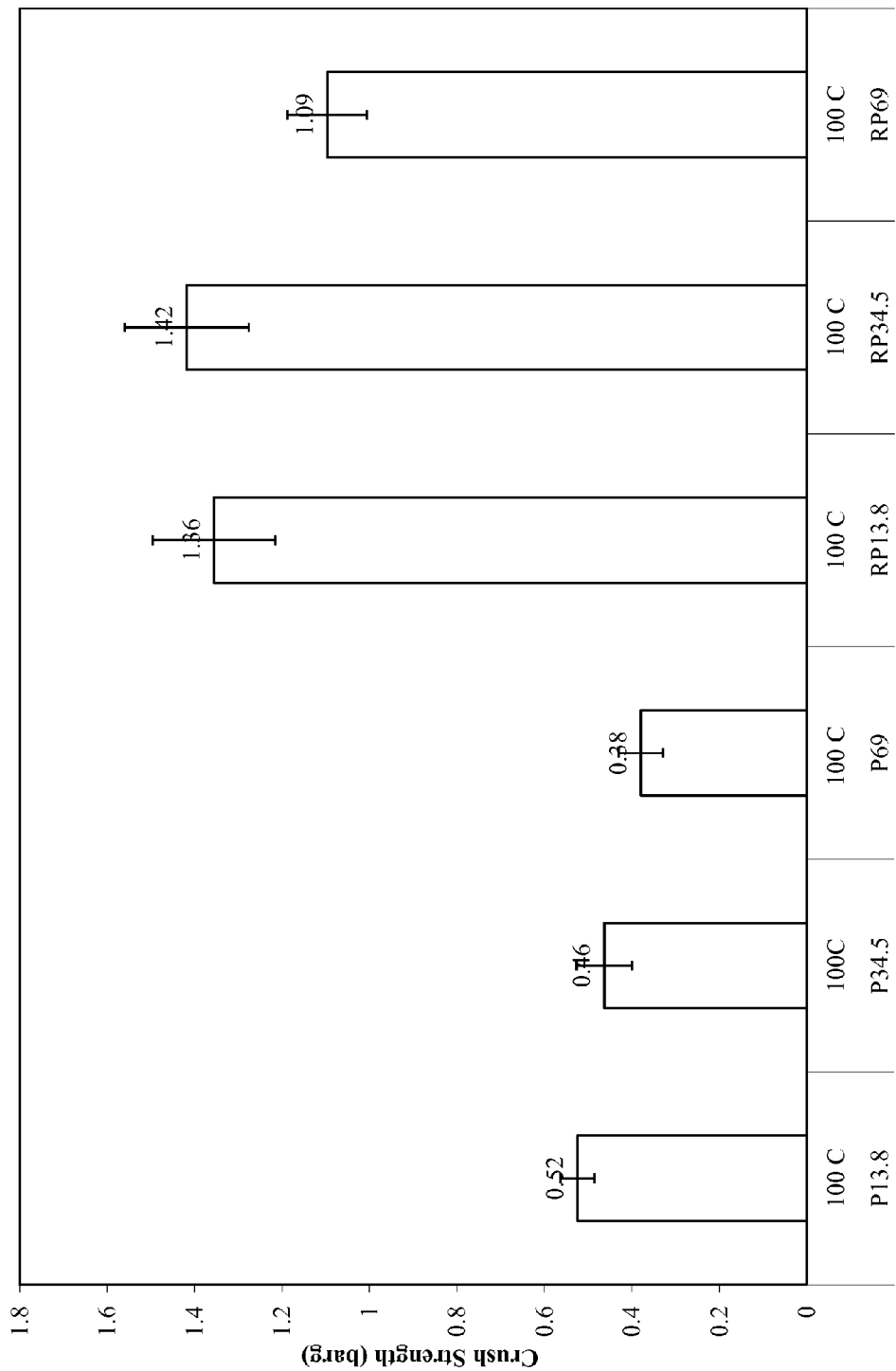
FIG. 7 compares crush strengths of $TiO_2$ based scrub granules with sodium aluminate binder compressed respectively under 13.8 barg, 34.5 barg, and 69 barg roll pressures in accordance with embodiments of the invention.

FIG. 7 shows pressure rolling and recycling significantly affect the quality of briquettes that are formed. Average crush strength of briquettes formed at roll pressure of 13.8 barg is higher than at roll pressure of 69 barg with or without recycling. However, crush strength for a roll pressure of 34.5 barg is slightly higher than those values obtained at 13.8 barg.

Effect of Drying Temperature

The effect of drying temperature on the quality and strength of compacted briquettes in accordance with embodiments of the invention described above were also studied. The compacted briquettes discharged from the pressure roll was dried at 100° C. (overnight), 300° C. (1 hour), 500° C. (1 hour) and 700° C. (1 hour). $TiO_2$-binder mixture included 2.5% sodium aluminate binder premixed with $TiO_2$ pigment with an initial moisture content of about 7%. The $TiO_2$-binder mixture were compacted into briquettes via pressure roll and respectively dried at 100° C. (overnight), 300° C. (1 hour), 500° C. (1 hour) and 700° C. (1 hour).

Figure 8:
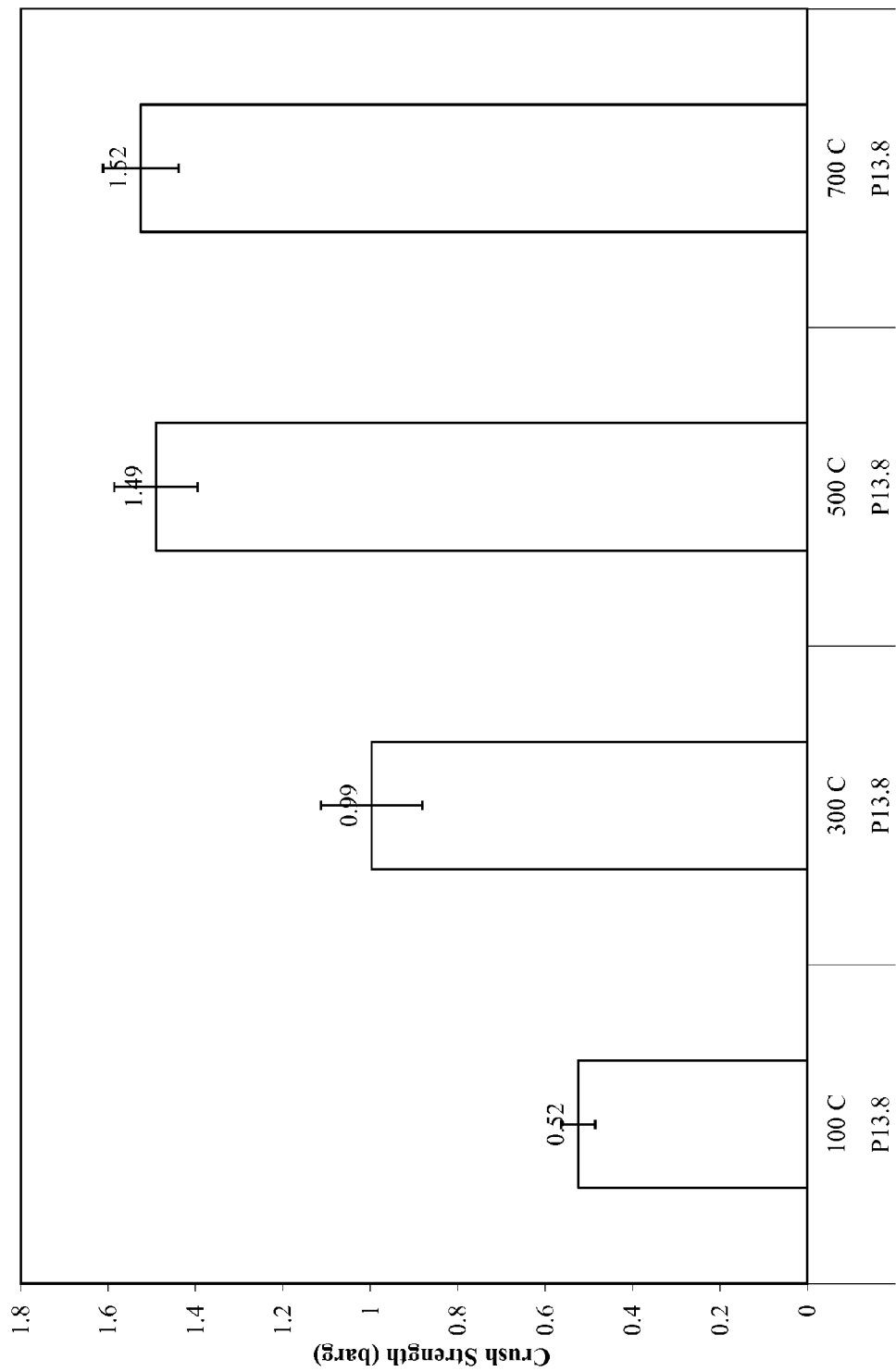
FIG. 8 compares crush strengths of $TiO_2$ based scrub granules with sodium aluminate binder compressed under 13.8 barg and dried at respective temperature conditions in accordance with embodiments of the invention.
Figure 9:
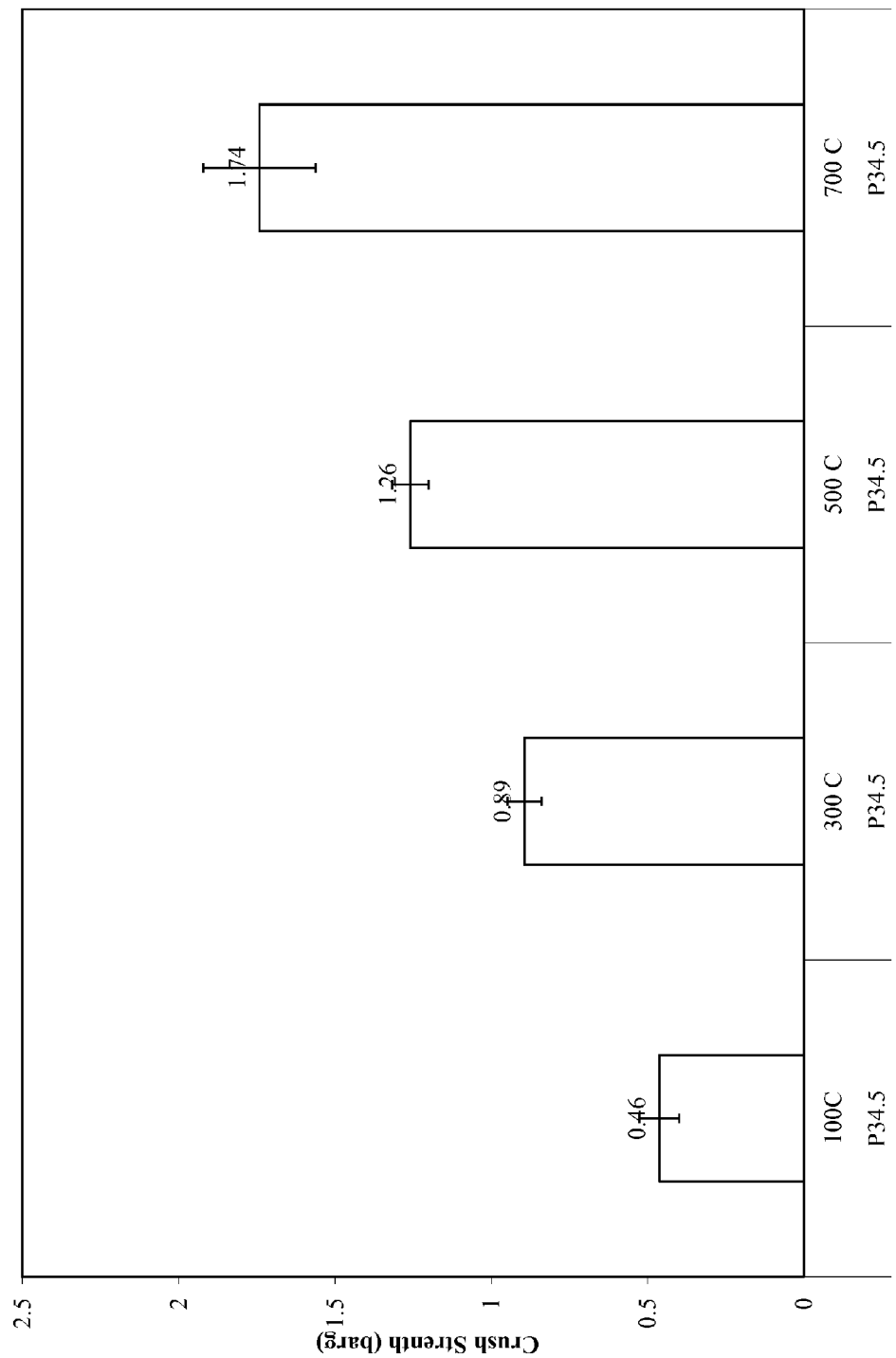
FIG. 9 compares crush strengths of $TiO_2$ based scrub granules with sodium aluminate binder compressed under 34.5 barg and dried at respective temperature conditions in accordance with embodiments of the invention.
Figure 10:
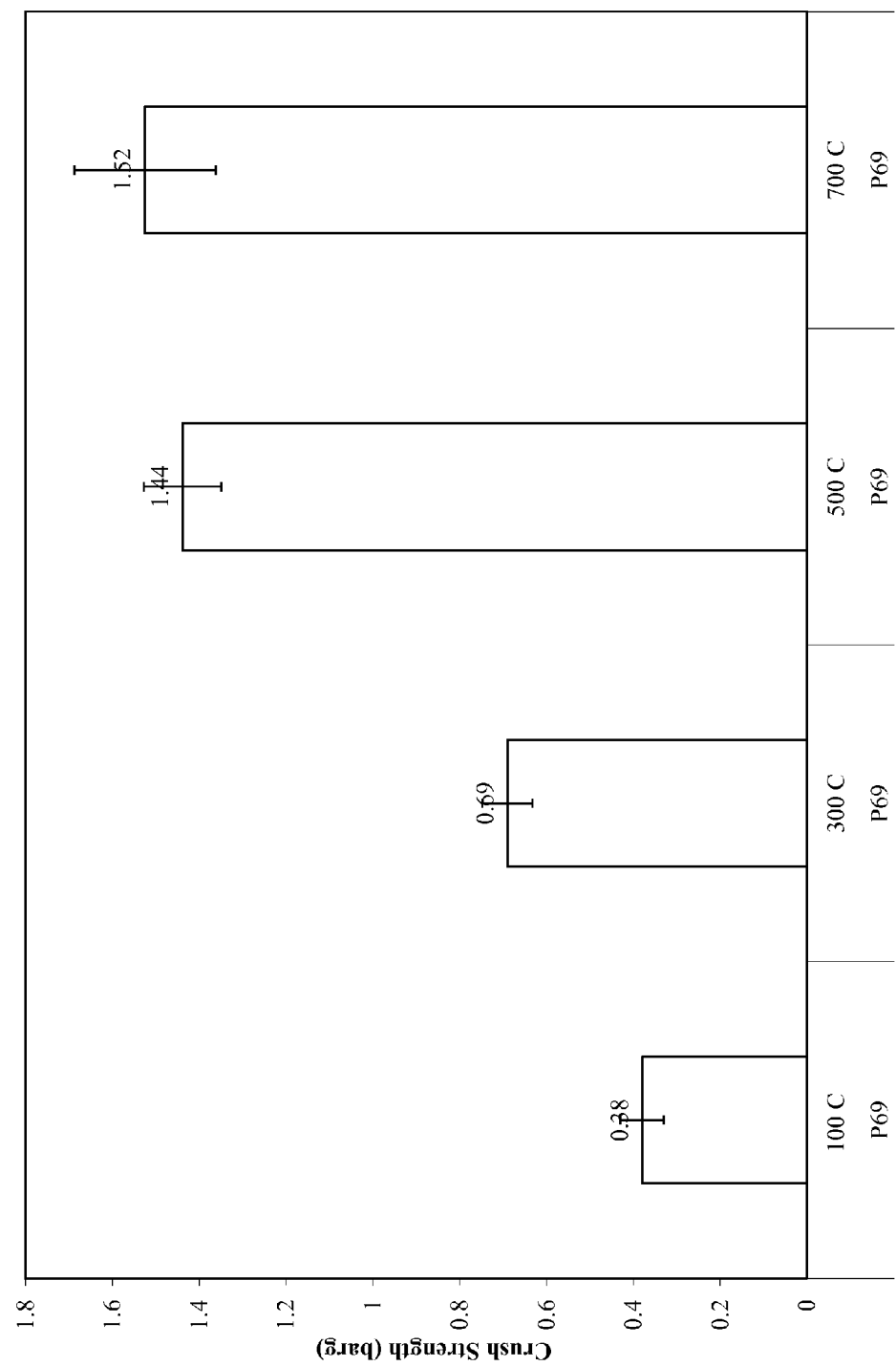
FIG. 10 compares crush strengths of $TiO_2$ based scrub granules with sodium aluminate binder compressed under 69 barg dried at respective temperature conditions in accordance with embodiments of the invention.

FIGS. 8-10 crush data show that, independent of the compacting roll pressure, an increase in drying temperature increases crush strength of the compacted briquettes.

Granulation Studies Using Lab Scale Mixer

In these studies, $TiO_2$ Spray Dryer Discharge pigment particles, binder, and water were combined. A mixer DISPERMAT™ fitted with a 50 mm high-shear impeller, was used for mixing.

In the test procedure, amounts of binder and $TiO_2$ pigment were placed in the mixer and mixed at about 300 rpm speed. During mixing, water was added to obtain an initial moisture content of about 6% to 8%. Mixing was continued for about 10-15 minutes or until $TiO_2$-binder mixture sticking to the mixer was observed. $TiO_2$-binder granules formed were then dried in an oven at 100° C. overnight. The dried $TiO_2$ based scrubbing granules was then sieved into different mass fractions. $TiO_2$ based scrubbing granules larger than 3 mm in size were taken and analyzed for crush strength.

Figure 11:
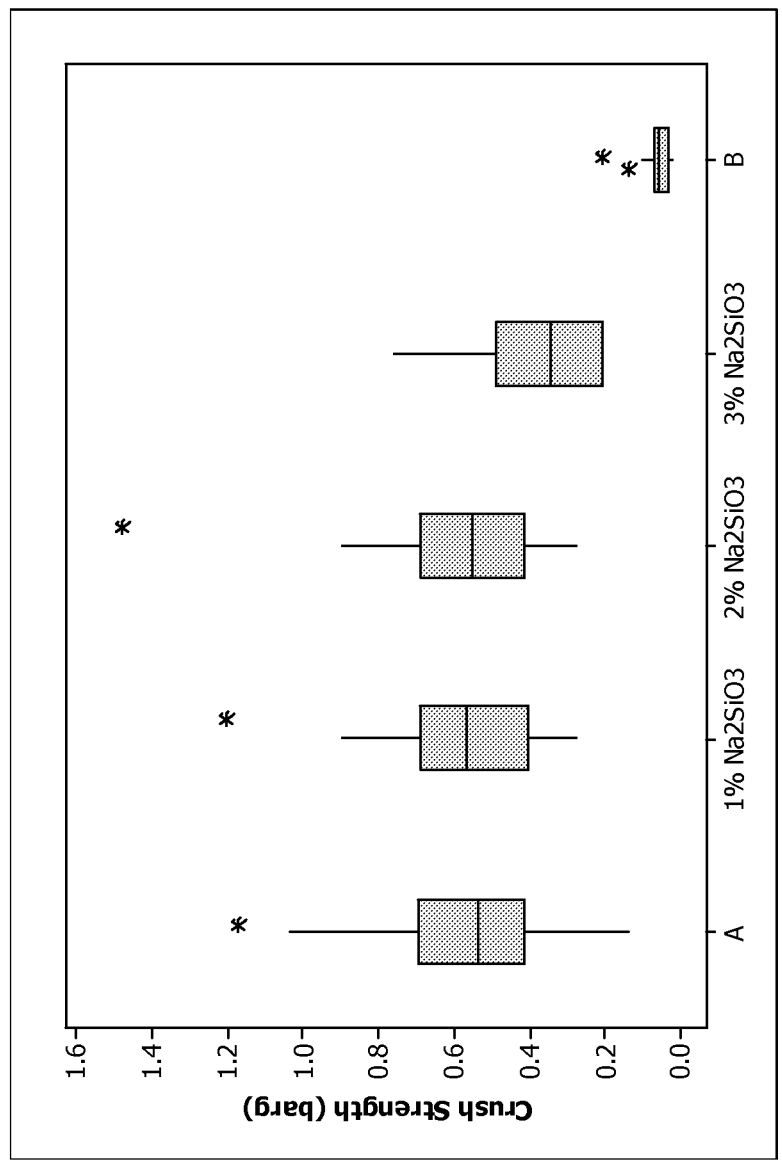
FIG. 11 is a boxplot comparison of crush strengths of same comparative examples calcined $TiO_2$ scrubs A and B versus $TiO_2$ based scrubbing granules with sodium silicate binder, not pressure rolled and dried at 100° C. overnight in accordance with embodiments of the invention.

Sodium Silicate as Binder $TiO_2$-binder mixture with respectively 1%, 2%, and 3% sodium silicate binder and $TiO_2$ pigment in accordance with embodiments of the invention were mixed as described above. FIG. 11 shows comparison of crush strength values of $TiO_2$-based scrubbing granules with respectively 1%, 2%, and 3% sodium silicate binder compared to comparative examples A and B calcined $TiO_2$ scrubs.

Crush strength values of $TiO_2$-based scrubbing granules with 1%, and 2% sodium silicate binder are similar to comparative example A calcined $TiO_2$ scrub, whereas, $TiO_2$ based scrubbing granules with 3% sodium silicate binder have a lower average crush strength value than the comparative example A calcined $TiO_2$ scrub, but a higher value than comparative example B calcined $TiO_2$ scrub.

Figure 12:
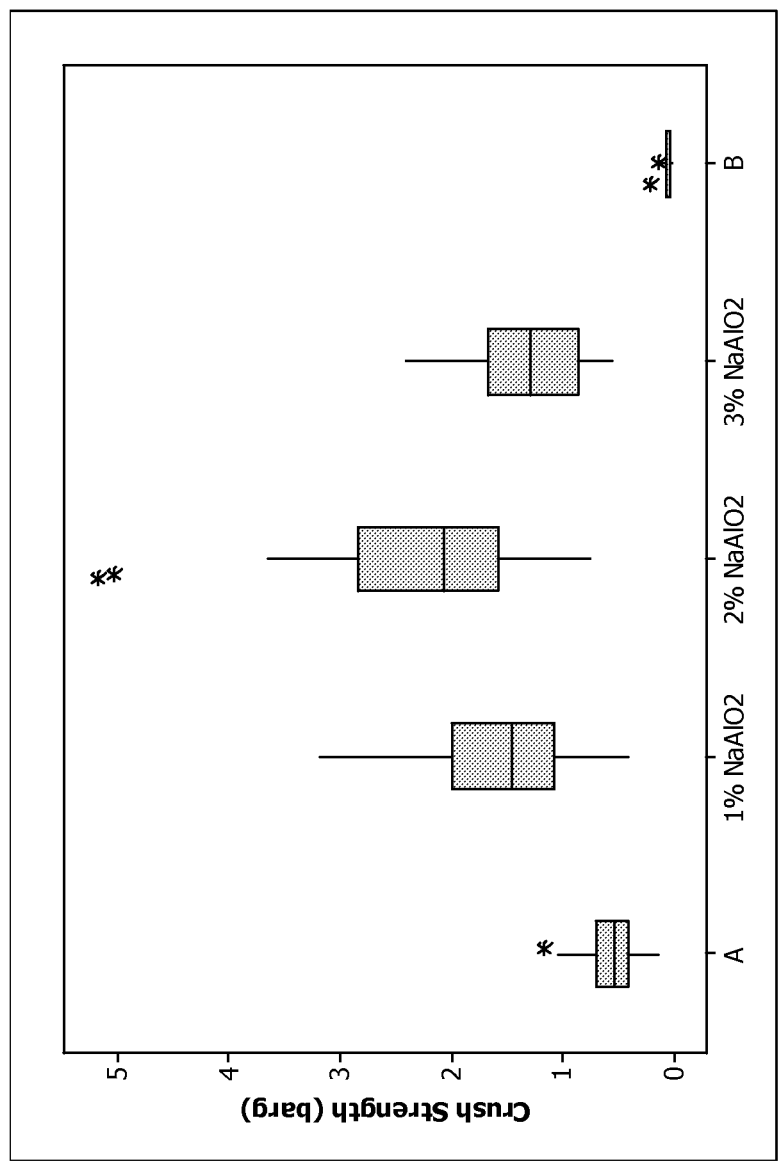
FIG. 12 is a boxplot comparison of crush strengths of same comparative examples calcined $TiO_2$ scrubs A and B versus $TiO_2$ based scrubbing granules with sodium aluminate binder, not pressure rolled and dried at 100° C. overnight in accordance with an embodiment of the invention

Sodium Aluminate as Binder $TiO_2$-binder mixture with respectively 1%, 2%, and 3% sodium aluminate binder and $TiO_2$ pigment were mixed as described above. FIG. 12 compares of crush strength values of $TiO_2$-based scrubbing with respectively 1%, 2%, and 3% sodium aluminate binder. Average crush strength values of $TiO_2$-based scrubbing granules with 1%, 2% and 3% sodium aluminate binder are higher than comparative examples A and B calcined $TiO_2$ scrubs.

In general, with all tested binders, the crush strength of the granulated TiO2-based scrubbing granules increased as binder concentration increased from about 0.5% to about 3%. $TiO_2$-based scrubbing granules formed with sodium aluminate as a binder had higher crush strength values when compared to sodium silicate or sodium chloride as binders. Also, granulated $TiO_2$-based scrubbing granules with sodium aluminate showed an increased crush strength as (1) binder concentration increased from 0.5% to 2.5%, (2) drying temperature increased from 100° C. to 700° C., (3) granules or briquettes of less than 3.0 mm in size were recycled, and (4) initial moisture content was increased from 3% to 7%.

Pilot Scale Studies

Pilot scale studies were performed at a vendor facility to corroborate the laboratory results described above.

Sodium aluminate was used as the binder for the pilot studies. Two experiments with binder levels of 2.5% and 4% sodium aluminate in accordance with embodiments of the invention described above were conducted. As in Step 210 FIG. 2, sodium aluminate binder was mixed with $TiO_2$ spray dryer discharge using a mixer Turbulizer™ (model TCJS-8) to form a TiO2-binder mixture. As in Step 220, the $TiO_2$-binder mixture was compacted using a pilot scale MS-75 compaction system at 454 kg/hour feed rate.

As in Step 230, the compacted briquettes were broken into granules via passing through a flake breaker; Sweco 60" screener and a Frewitt™ granulator produce $TiO_2$ binder granules of desired size (e.g., 3.36 mm×1 mm or 2 mm×1 mm). As in Step 240 screening, $TiO_2$ binder granules smaller than 1 mm were recycled to the feed hopper whereas granules greater than 3.36 mm or 2 mm were recycled to the granulator. The $TiO_2$-based binder granules meeting the above-noted specifications was collected and dried as in Step 260 to less than 1% moisture by to form $TiO_2$ based scrubbing granules. $TiO_2$-based binder granules were dried passing through a 1 $m^2$ fluid bed dryer. The strength of the $TiO_2$-based binder granules produced was tested using an attrition method as described below.

Attrition Test Method:

$TiO_2$-based binder granules s in accordance with embodiments of the invention were compared to comparative calcined $TiO_2$ scrubs examples A and B using attrition tests.

The attrition test was run by screening $TiO_2$ based scrubbing granules using a Ro-Tap® sieve shaker, fitted with screens the same size as or slightly finer than the desired product, for five minutes typically. All fines (smaller than 20 mesh) were discarded. Fifty grams of the product larger than 20 mesh were placed on the 20 m mesh screen with (50) ⅜" steel balls (171.18 g). The Ro-Tap® sieve shaker was run for five minutes without tapper. The percentage of fines (<20 mesh) found in the pan as a result of the attrition from the steel balls is the attrition number. A lower number indicates harder granules.

The average attrition number of $TiO_2$ binder granules (undried) and the $TiO_2$ based scrubbing granule (dried $TiO_2$ binder granules) at 165° C. were respectively 20% and 1.5%, indicating the desirability of drying to form harder granules. The average attrition value of Comparative example A calcined $TiO_2$ scrub was 6.7% compared to the 1.5% achieved through an embodiment of the present invention; thus, embodiments of methods of the invention formed harder granules than the comparative example A calcined $TiO_2$ scrub. The attrition numbers did not change significantly (1.3% vs. 1.5% seen in Table 1 below) when the binder level was increased from 2.5% to 4%, thereby confirming laboratory results described above. Increasing binder levels from 0.5% to 2.5% formed harder $TiO_2$ based scrubbing granules; but, significant impact was not observed when binder level was increased above 2.5%. In addition, at 4% binder level, processing issues related to caking in the compaction feed hopper was observed. The drying temperature in the fluid bed dryer was varied from about 121° C. to about 165° C.

TABLE 1

Results of pilot study using compactor

| | Test # | |
|---|---|---|
| | 1 | 2 |
| TiO2 Feed Rate (lb/hr) | 1,000 | 1,000 |
| Sodium Aluminate* | 2.50% | 4.00% |
| MS75 Roll Face | Stick | Stick |
| MS75 Roll (psi) | 500 | 500 |
| MS75 Roll (rpm) | 3.5 | 3.5 |
| MS75 screw type | Straight | Straight |
| Screw Speed (rpm) | 118 | 100 |
| Product Attrition Fresh | 29.20% | 26.80% |
| Product Attrition Cured | 1.30% | 1.50% |

Laboratory finishing process evaluation was conducted using the $TiO_2$ based scrubbing granule produced through a MS75™ compaction system as described above. As described in FIG. 3, $TiO_2$-based binder granules were introduced into Oxidizer $TiO_2$ slurry and processed through sand mills, treatment, drying and milling processes as is typically performed to produce commercially acceptable finished $TiO_2$ product such as finished $TiO_2$ pigment. The effect of $TiO_2$ based scrubbing granules on finished $TiO_2$ pigment was evaluated for performance in a paint application. Table 2 is a Laboratory Investigation result of Performance Prototype Samples prepared in Lab; Micronized at Pilot Plant using air at 290° C. and $TiO_2$=0.227 kg/min Unexpected results show that finished $TiO_2$ pigment with some of the of $TiO_2$ based scrubbing granule were substantially identical when compared to finished product TiONA® 595 that did not include the $TiO_2$ based scrubbing granule. Lab finishing process compatibility studies in Table 2 with TiONA® 595 oxidizer base mixed with 5% $TiO_2$ based scrubbing granules show that there was no difference in the quality of finished $TiO_2$ pigment formed when compared to TiONA® 595 without the $TiO_2$ based scrubbing granules. Such results indicate that the $TiO_2$-based binder granules do not need to be removed from the finished $TiO_2$ pigment. Furthermore, results indicate that using sodium aluminate binder does not appear to introduce contamination and/or impart undesirable properties into finished $TiO_2$ pigment.

Each of the patents, published patent applications, references and articles cited herein is hereby expressly incorporated herein by reference in its entirety.

It will be apparent to those skilled in the art that various modifications and variations can be made in the method and system of the present invention without departing from the spirit or scope of the invention. Thus, it is intended that the presently disclosed and/or claimed inventive concept(s) includes modifications and variations that are within the scope of the appended claims and their equivalents.

While the presently disclosed and/or claimed inventive concept(s) has been described in detail in connection with only a limited number of aspects, it should be understood that the presently disclosed and/or claimed inventive concept(s) is not limited to such disclosed aspects. Rather, the presently disclosed and/or claimed inventive concept(s) can be modified to incorporate any number of variations, alterations, substitutions, or equivalent arrangements not heretofore described but which are commensurate with the scope of the claims. Additionally, while various embodiments of the presently disclosed and/or claimed inventive concept(s) have been described, it is to be understood that aspects of the presently disclosed and/or claimed inventive concept(s) may include only some of the described embodiments. Accordingly, the presently disclosed and/or claimed inventive concept(s) is not to be seen as limited by the foregoing description but is only limited by the scope of the appended claims.

What is claimed is:

1. A method of making $TiO_2$-based scrubbing granules comprising:
   i. combining $TiO_2$ particles with sodium aluminate binder to form $TiO_2$-binder mixture comprising from about 0.5% to about 20% dry weight binder;
   ii. granulating the $TiO_2$-binder mixture; and
   iii. drying the granulated $TiO_2$-binder mixture to form $TiO_2$-based scrubbing granules;
   further comprising compacting the $TiO_2$-binder mixture under pressure to form the $TiO_2$-binder mixture into compacted briquettes; and
   comprising breaking the compacted briquettes into $TiO_2$-binder granules having average size in a range of from about 1 mm to about 25 mm.

TABLE 2

Lab Investigation - Effect of $TiO_2$-based scrubbing granules on Product Performance

| Sample Description | Mean/ GSD | IEP pH | Interior high-gloss latex paint Brightness | | Interior high-gloss latex paint Gloss | | Exterior Tint base | |
|---|---|---|---|---|---|---|---|---|
| | | | % L | Δb | 20° | 60° | % L | Δb |
| TiONA 595 ™ Oxidizer base + 5% Scrubs, then sandmilled, surface treated, dried in lab | 0.280/1.424 | 7.3 | 100 | 0 | 5 | 5 | 100.2 | −0.1 |
| TiONA 595 ™ Oxidizer base + 5% Scrubs, then sandmilled, surface treated, dried in lab | 0.277/1.409 | 7.5 | 100 | 0.15 | 4 | 5 | 100.2 | −0.11 |
| Baseline - TiONA 595 ™ oxidizer base as | 0.274/1.401 | 7.52 | 100.1 | 0.05 | 5 | 5 | 100.2 | −0.2 |

Note:
GSD is Geometric Standard Deviation; IEP is Isoelectric Point

2. The method of claim 1, wherein the binder further comprises an inorganic metal salt.

3. The method of claim 1, wherein the binder further comprises an inorganic metal salt selected from the group consisting of sodium sulfate, sodium phosphate, sodium silicate, sodium chloride, sodium hexametaphosphate, aluminum sulfate, and combinations thereof.

4. The method of claim 1, further comprising breaking the compacted briquettes into $TiO_2$-binder granules having an average size in a range of from about 1 mm to about 25 mm.

5. The method of claim 1, wherein drying the $TiO_2$-binder mixture comprises heating at a temperature in a range of from about 100° C. to about 700° C.

6. The method of claim 1, wherein the $TiO_2$ particles are produced by a chloride or sulfate $TiO_2$ manufacturing process.

7. The method of claim 1, wherein the $TiO_2$-based scrubbing granules are unsintered.

* * * * *